Figure 1:
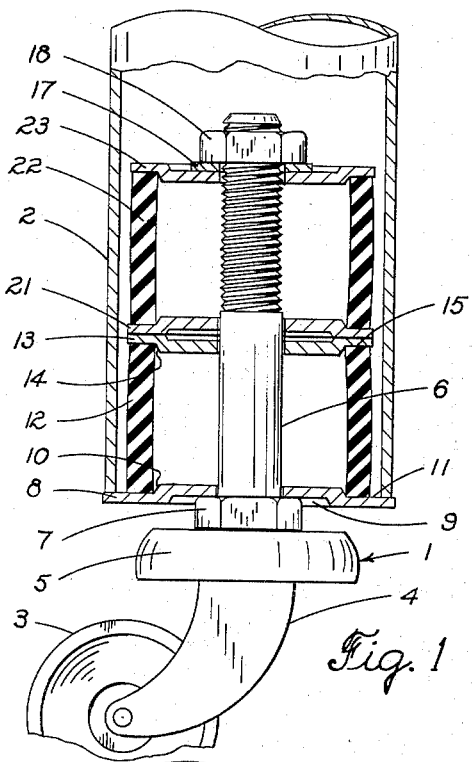

Aug. 29, 1950     W. C. ROE     2,520,375

ADAPTER

Filed June 24, 1946

INVENTOR.
WILLIAM C. ROE

BY

ATTORNEYS

Patented Aug. 29, 1950

2,520,375

UNITED STATES PATENT OFFICE 2,520,375

ADAPTER

William C. Roe, Elyria, Ohio, assignor to The Colson Corporation, Elyria, Ohio, a corporation of Ohio Application June 24, 1946, Serial No. 678,739

4 Claims. (Cl. 16—39)

This invention relates to attaching means such as those which are adapted to secure and removably attach casters and the like at the ends of hollow furniture tubes, and more particularly to improvements in such means, commonly called adapters, which employ expansible, often rubber or rubber-like, parts to removably engage the interiors of such tubes. This application is a continuation in part of my copending application, Serial No. 487,826, filed May 20, 1943, now Patent No. 2,430,737, issued November 11, 1947.

I am aware that others have employed rubber or rubber-like expansible parts in adapters, but prior workers in the art as a rule have sought to effect diametric enlargement of the rubber parts largely by direct longitudinal compression of substantially solid masses thereof, sometimes accompanied by or intended to be accompanied by a wedging expansion of the compressed material. These prior practices have posed problems to which my invention is addressed as a solution. For example, when diametric expansion is sought from longitudinal compression of a solid mass of rubber one is caught on the horns of a dilemma. If the rubber be strong enough to carry desirable loads between the tube and caster stud, it will tend to require high compressive forces to bring about enough diametrical enlargement to serve any desirably allowable variations in size and shape between different tubes and adapters to be engaged. On the other hand if the rubber be soft or weak enough to appear to permit enough expansion for even a limited range of adaptability under the influence of desirably small compressive forces it will be correspondingly weak in transmitting loads between the tube and the caster stud. Providing wedging surfaces to expand rubber-like parts brings along another series of difficulties and limitations that are aggravated by the inherently high friction that is desirable to have in the rubber for its engagement with the tube. Thus if a low wedging angle is used for its mechanical advantage it may be difficult if not substantially impossible to bring about a release or disengagement of the parts. If a higher wedging angle is employed correspondingly greater effort is required to effect the desired expansion until one approaches the condition of direct compression above mentioned. Combining a wedging action with bodily compression of the rubber combines the difficulties and aggravations thereof and adds awkwardness since the part of the rubber that is expanded into contact with the tube resists by its grip upon the tube the forces intended to be transmitted to the parts of the rubber not directly expanded by the wedge. If expansion of the latter part is not effected by direct compression its service is lost and no intended combined effects are obtained.

My invention turns away from these prior practices and gives a wide range of useful overall diametric expansion of the rubber-like element by a bending action of the walls thereof as distinguished from either a wedged expansion or a bodily compression or a combination of the latter. The underlying principle of my invention is adapted to be carried out in a relatively thin walled sleeve or expander of tough resilient rubber or rubber-like material in which the length, wall thickness and diameter are so proportioned and the forces are so applied that the mid-portions of the walls of the sleeve bulge outwardly into an exaggerated barrel-like form as the ends are forcibly moved together wherewith the walls as viewed in the cross section are bowed or bellied outwardly until contact with a satisfactory grip upon the adjacent surfaces of the tube is had. If the rubber-like sleeves be substantially cylindrical in their idle position and the interior of the tube be square then the inherent nature of the operation of my invention permits the greater bulging of the walls to proceed in the direction of the diagonal of the square whilst the lesser bulging is confined by the sides of the square first having contact with the walls of the sleeve. By the employment of relatively thin wall rubber sleeves or expanders I am able to effect a distribution of the grip and a distribution of the unit pressure between the expander and the tube both longitudinally and circumferentially wherewith to enhance the adaptability of the device to different sizes, shapes and conditions of tubing.

In the practice of my invention I have observed an analogy between the operation of my rubber-like sleeves or expanders and the operations of hollow cylindrical structural columns, having regard for the great difference in materials. That is to say, I have found it preferable that the length of the sleeves be less than what is termed a long column which tends to fail by bending its axis rather than by bulging its walls outwardly under axially imposed loads. By the same analogy I prefer that the length of my sleeves or expanders in relation to the wall thickness and diameter thereof be not so short as to act as a very short column or pier in which the walls will be merely thickened under axial load rather than bowed or bellied outwardly to have the characteristic mode of operation of my invention. By proportioning the rubber or rubber-like sleeves of my invention to have the characteristic mode of operation that I obtain I am able to get a wide range of efficient expansion while retaining desirable load bearing characteristics and strength, and I am able to effect the expansion and strong gripping and supporting effects by the exertion of very modest forces such as can be applied by the hands and fingers throughout the range of sizes of tubes and adapters as ordinarily found in furniture tubes wherein my adapter is widely used.

It is thus an object of my invention to provide an adapter employing the novel principle and achieving the benefits and advantages above discussed.

It is also among the objects of my invention to provide an expansible adapter employing resilient rubber-like means which is simple in design and construction, efficient in use and economical in manufacture. It is another object to provide an adapter which may be readily adjusted and put to its intended use with the application of a modest manual effort, and with desirably even distribution of strong gripping forces. Another object is to avoid the danger of damaging or distorting the tube either by excessive highly localized stresses or by injuring its finish or appearance as by distortion or unwitting contact with wrenches, hammers, etc.

Another object is to provide an adapter with a wide range of adjustment and adaptability for use with tubes of different size and different cross sectional shapes such as circular, square and hexagonal. A further object is to provide an adapter wherein relatively large tube gripping effects over wide areas of gripping engagement can be obtained with small effort and unusual ease of installation and removal. A further object is to provide an adapter having shock absorbing qualities and which will tend to dampen vibration and reduce noise.

Figure 2:
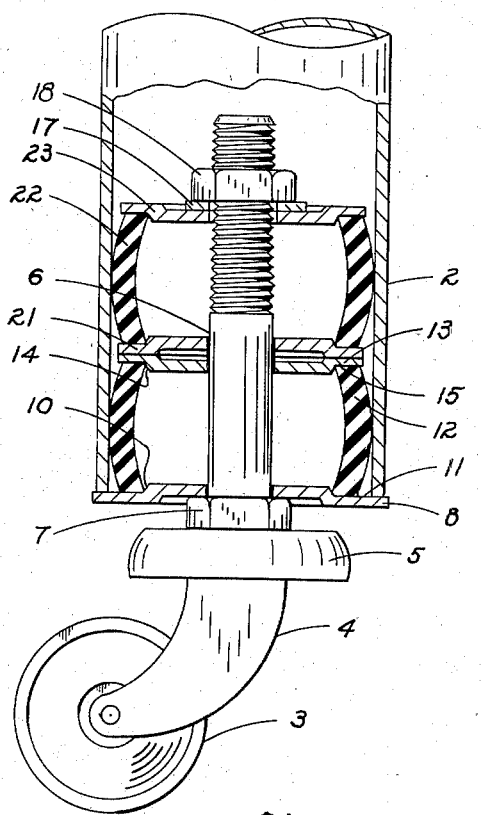
Figure 3:
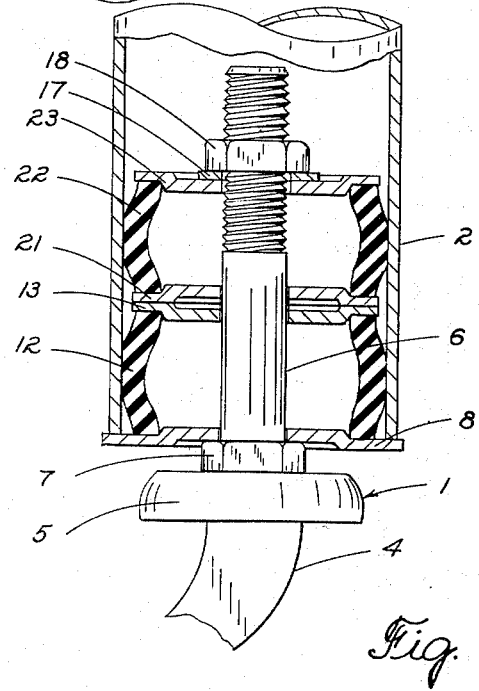
Figure 4:
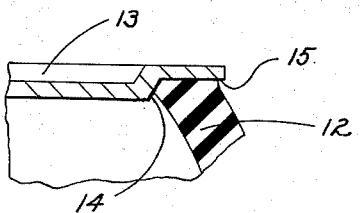

The foregoing and other objects will more fully appear from the following description of a preferred form of my invention, reference being had to the accompanying drawings in which:

Figure 1 is a longitudinal sectional view showing my adapter as first inserted within the end of a hollow furniture tube prior to substantial expansion thereof. Figure 2 is a similar longitudinal sectional view showing the parts with the adapter partially expanded to a position of initial contact with the interior of the tube. Figure 3 is a similar longitudinal sectional view showing the parts in a position of substantially full gripping engagement, and Figure 4 is a fragmentary view in similar section of the end of a sleeve and supporting washer.

For purposes of illustration a preferred form of my invention is described with reference to a caster and adapter assembly 1 and a furniture tube 2, the open end of which comprises the socket into which the adapter is inserted and with the interior surface of which the adapter is expanded into engagement. Referring to Figure 1, the caster wheel 3 is shown conventionally mounted on a bracket 4 which is carried by means of a fitting and bearings, from a bearing casing or annulus 5. A caster stem or stud 6 securely fastened to the casing 5 extends vertically upward from the center thereof, its upper end being threaded and its lower end adjacent the upper face of the casing having an integrally acting enlargement preferably in the form of a nut 7 so that the casing, stud and nut may be rotated as a unit, either by applying torque to the nut or by turning the casing by hand. Fitting freely and closely centered on the stud and resting on the enlargement 7 is a plate or washer 8 the peripheral edge of which is preferably substantially the same size and shape as the outside of the lower end of the tube 2 and which contacts the end of the tube when the caster and adapter assembly is inserted into the tube. The washer 8 is centrally dished as at 9 wherewith to form an annular shoulder 10 on its upper face which delimits the inward edge of the annular surface 11 upon the inner portion of which the lower edge of the right cylindrical or somewhat barrel shaped rubber or rubber-like sleeve or expander 12 is seated. Preferably the shoulder 10 is of substantially the same diameter as the internal diameter of the sleeve 12 wherewith the sleeve is centered with respect to the washer 8 and the stud 6. Preferably the outside diameter of particularly the ends of the sleeve 12, as well as of the mid-portions thereof when the parts are in substantially idle position substantially as shown in Figure 1, is measurably less than the inside diameter or at least transverse dimension of the socket of the tube 2 whereby to permit an initial free bending of the walls of the sleeve before making initial contact with the tube as will more fully appear below.

Resting upon and centering the upper end of the sleeve or expander with respect to the axis of the stud is a washer 13 having a free but close sliding and rotatable fit with the stud 6 and whose central portion is dished downwardly, as viewed, providing an annular shoulder 14, which corresponds to the annular shoulder 10 of the washer 8 and has the same relation to and coaction with the inner edge of the top end of the sleeve 12 as has the shoulder 10 with the lower end and edge thereof. The washer 13 also comprises a flat annular portion 15 extending beyond the shoulder 14 a radial distance somewhat greater than the thickness of the wall of the sleeve 12 wherewith to form a bearing surface for the upper end of the sleeve. I prefer that the diameter of the washer 13 exceed the outside diameter of the end of the sleeve 12 by a modest amount to insure against the washer tending to telescope within the sleeve under axial pressure and to space the sleeve from the socket.

In this preferred form of my invention I provide a second sleeve 22 which may be identical with the sleeve 12 having its lower end bearing on a centering washer 21 that may be identical with the washer 13 with its dished central portion facing upwardly as shown, and I also provide for the upper end of the sleeve 22 a washer 23 that is identical with the washer 13 and similarly disposed wherewith to center and engage the upper end of the sleeve 22.

Threaded on the upper portion of the stud 6 is a nut 18 which through an appropriate lock washer 17 engages the washer 23 wherewith downward threading motion of the nut 18 relative to the stud 6 forces the washer downwardly and exerts an axial compressive force upon the ends of the sleeves 12 and 22, which force is equally distributed between the sleeves by virtue of the freedom of movement of the washers 13, 21 and 23 longitudinally of the stud. Once the nut 18 through the lock washer 17 has contact and frictional engagement with the washer 23 then threading torque and motion may be transmitted to the nut relative to the stud from the bottom washer 8 through the sleeves and washers 13, 21 and 23 since they have contact and friction on a much greater radius than the pitch radius of the threads of the nut 18 and stud 6. While the adapter is free of the tube it is practicable to first spin the nut down the stud to an initial contact with the washer 23. Thereafter continued relative rotation between the washer 8 and the casing 5 will continue to compress the assembly of washers and sleeves. As suggested in Figure 1, I prefer that the assembly be slightly precompressed, bulging the sleeves a little, when the adapter is first inserted into the socket of the tube. Thereafter the washer 8 can be held manually whilst the stud is rotated to effect further expansion of the sleeves. As the expansion proceeds, cf. Figs. 1, 2 and 3, the sleeves will frictionally engage the socket wherewith to hold the nut non-rotatable with respect thereto so that the remaining increments of desirable screwing movement between the nut and the stud can be obtained by rotation of the stud relative to the tube without manual restraint of the washer 8.

Preferably the sleeves or expanders 12 and 22 are hollow right cylindrical tough, about 50 to 70 durometer, rubber or rubber-like elements with their ends cut square whereby to seat squarely on the flat radial surfaces of the several centering washers respectively. The washers 8, 13, 21 and 23 are preferably punched and pressed from metal stock of quality such as to take the loads required, but it is not of disadvantage that the peripheral parts of the washers, such as 8 and 23 yield a little with respect to the central parts as the sleeves are compressed since such yielding would tend to incline the ends of the sleeves in harmony with the desired outward bending and bulging of the walls. This effect may be enhanced when desired by inserting a spacer between the central dished parts of the washers 13 and 21 wherewith to space the sleeve supporting parts thereof enough to permit a desired degree of flexing as the walls of the sleeves bend.

As mentioned above the shape, size and character of the expanders relative to the socket of the tube and associated parts influences the efficiency and mode of operation of the invention. The following example is stated by way of illustration rather than limitation. I have found it practicable to employ with a circular cylindrical socket tube of about 2.15" internal diameter, sleeves 12 and 22 each about 1.25" long, about 1.8" external diameter with walls of uniform thickness about 0.2" thick, washers 13, 21 and 23 about 2.0" in diameter, washer 8 corresponding to the O. D. of the end of the socket, and a stud about ½" in diameter and a little more than 3" long. With the parts so proportioned, and assembled as above described, and with a little preliminary pre-compression exerted between the nut 18 and the stud, the external surfaces of the walls of the sleeves clear the inside of the socket by approximately ⅛" when the adapter as a whole is inserted into the socket as shown in Figure 1. The interior surfaces of the sleeves were widely spaced from the stud. After the assembly is inserted in the socket further turning of the stud relative to the nut 18 exerts increasing axial force upon the ends of the sleeve assembly and continues the bellying and outward bulging of the sleeves or expanders, bending rather than thickening the walls thereof until the mid-portions of the walls have contact with the socket substantially as shown in Figure 2. Thereafter continued turning of the stud will continue to shorten the whole assembly wherewith to increase the area of contact between the expanders and the socket and to increase the grip therebetween until the parts have the desired security of engagement. Reverse rotation of the stud releases the grip between the parts whilst the sleeves exert their inherent tendency to resume their cylindrical or elongated form.

It is to be noted, however, that after the walls of the expanders begin to bend outwardly as shown, but small additional increase of axial force is required to effect a large increase in the bending of the walls whereby relatively light torque exerted through the stud readily increases the bending of the walls of the expanders through a wide range of expansion. Moreover after the expanders have first contacted the socket as shown in Figure 2, additional compression of the sleeves longitudinally causes the degree of bending of the walls thereof to be more acute. Thus much as a toggle has an increasing mechanical advantage as the angle between the legs thereof is decreased, my invention takes increasing advantage of additional increments of axial thrust to enhance the radial grip between the sleeves and the socket. Unlike a toggle, however, my expanders achieve an increasing area of contact with the walls of the socket as the lengths of the expanders are reduced by axial thrust whereby an increasing grip between the adapter and the socket is advantageously effected without risking undesirably high unit pressures between localized parts of the adapter and the socket.

It is desirable to have the external surfaces particularly of the ends of the expansible sleeves of smaller external diameter than the internal diameter or mean internal transverse dimension of the socket wherewith to permit and/or induce the beginning of or at least a net effective bending action of the walls of the expanders wherewith to take advantage of and initiate the toggle-like effect above mentioned. After the expanders have well or fully engaged the socket the mid-portions, i. e., the engaged portions, of the expanders conform to the shape of the socket while the portions of the expanders between the ends and the middle tend to lie in compound reverse curves, Figure 3, or if the size of the socket permits or requires greater bulging of the wall of the expanders the ends of the expanders may come to have a more direct abutting relation to the shoulders such as 10 and 14 of the washers as shown in Figure 4.

Assuming the washer 8 has light peripheral contact with the end of the socket when contact between the expanders and the interior of the socket is first effected as shown in Figure 2, the progressive longitudinal contraction of the expanders to and toward the condition shown in Figure 3 will tend to draw the washer 8 into an increasingly snug contact with the end of the tube. After the furniture and caster have been used for a modest time and subjected to lateral loads and shocks as the caster wheel may be moved over uneven surfaces the washer 8 tends to acquire a spaced relationship from the end of the tube commensurate with the tipping of the stud from its co-axial place in the socket by the shocks and lateral forces transmitted from the caster. After the washer 8 becomes slightly spaced from the end of the tube by such usage it has no further tendency to increase its spacing since such forces and shock are fully absorbed directly between the sleeves and the socket. This desirable spaced relationship may be achieved in the first instance by manually spacing the washer away from the end of the tube when the parts are otherwise in about the state shown in Figure 2 and then carrying out the radial expansion and longitudinal compression of the adapter as a whole until an efficient load bearing grip is obtained between the adapter and the socket and the washer is drawn toward but short of direct or tight contact with the end of the tube. Particularly when the washer 8 is slightly out of contact with the end of the tube is there complete cushion and shock absorbing relation between the caster and the tube. When the washer 8 has some or complete contact with the end of the tube there is still a desirable shock absorbing relationship between the caster and the tube especially in respect to transverse loads and components thereof between the stud and the socket as the same are transmitted through the sleeves. It is also practicable to insert a rubber gasket, preferably from about $\frac{1}{32}''$ to $\frac{1}{16}''$ thick, between the end of the tube and the adjacent face of the gasket. This avoids initial direct metal to metal contact and insures initial resilience without impairing the desirable mode of operation and results above described.

Depending somewhat upon the service to be performed by my adapter one may employ the two sleeves 12 and 22 in the arrangement herein shown, or employ but one sleeve or a number greater than two as may be most desirable within the fundamental principles of my invention. It may be noted as one of the advantages of my invention that when two or more expander sleeves are employed it is not vital to successful operation that the sleeves have identical response to the axial force imposed upon them since one sleeve may begin its axial bending action before the other, but upon contact between the more easily bent sleeve and the socket it will have the support of the socket wherewith to induce the less easily bent sleeve to begin or increase its desired bending action.

I have mentioned a preference for straight cylindrical sleeves since this form suggests economy of production as by merely cutting of desired lengths from a long rubber tube, and as suggested in Fig. 1 such sleeves will upon a light axial compression take a barrel-shaped form. Thus it is entirely within the precepts of this invention as taught in my copending application that the sleeves be formed or molded in the first instance to have their walls bulged somewhat in the absence of axial compression. Forming the sleeves in barrel form in the first instance or forming the walls of the sleeves tapered or treated in such ways as to encourage or stimulate the outward bending or bulging thereof to realize the characteristic mode of operation of my invention is more fully illustrated in my copending application, wherein it is also taught to cut, cup or groove the sleeves to aid the initiation of the desired bulging action in supplement to the bulging propensity inherent from the proportioning of the length, wall thickness, etc., of sleeves of uniform wall thickness as emphasized herein. While I have emphasized my preference herein for the form of circular cylindrical sleeves the utility and advantage of forms embodying my invention other than truly circular as for use with square or rectangular sockets will be evident to those skilled in the art and is more fully illustrated in my copending application.

I am not now aware of all the limitations of the relationships of the parts such as between the length, diameter and wall thickness of my expander sleeves with regard to the qualities and characteristics of the rubber or rubber-like material that may be conveniently available for the practice of my invention. My preference as mentioned above is for tough resilient rubber or rubber-like material. Generally speaking I have found it practicable to make the sleeves of length not greatly different from the external diameter thereof and of length from about three to seven times the wall thickness thereof, having reasonable regard for the proportioning of the sleeves in their entirety within the principles and precepts hereof. I have also found it practicable when using substantially circular cylindrical sleeves and circular cylindrical sockets to have the external diameter of the sleeve as measured at their ends smaller than the inside diameter of the socket by a distance ranging from a small fraction of to somewhat greater than the thickness of the wall of the sleeve. When the socket takes polyangular form and the sleeves are of substantially cylindrical form the external diameter of the sleeves as measured at their ends may more closely approach the transverse dimension of the sockets as measured between the centers of the diametrically opposite flat walls thereof since the transverse dimensions of a polyangular socket as measured between diametrically opposite angled parts of the wall thereof will be correspondingly greater, wherewith to give a mean transverse dimension sufficient to permit a "mean" initial toggle-like bending of the aggregate of the several portions of the walls of the sleeves. In all events the character and proportions of the expander sleeves which appear to obtain the best advantage of the principle of my invention lie in that range where the symmetrical outward bending of the walls is the characteristic result of axial compression of the sleeves as distinguished from the mere swelling and thickening of the walls of undesirably short thick walled sleeves and the mere kinking or axial bending of the sleeves as a whole which is characteristic of sleeves that are too long and supple.

By way of further example I have found it commercially practicable to provide four sizes of rubber expander sleeves to cover the range from 1" to 2" O. D. tubing in about the following way. For round tubing from about 1" to $1\frac{1}{8}''$ O. D., $\frac{13}{16}''$ to $1\frac{1}{8}''$ I. D., or 1" outside square tubing, $\frac{15}{16}''$ inside square, right circular cylindrical expander sleeves $1\frac{1}{4}''$ long $\frac{25}{32}''$ O. D. with $\frac{9}{64}''$ wall thickness covers the range satisfactorily and with the characteristic operation above described. For round tubing from about $1\frac{1}{4}''$ to $1\frac{9}{16}''$ O. D., $1\frac{1}{16}''$ to $1^{13}/_{32}''$ I. D., or $1\frac{1}{4}''$ outside square tubing, $1\frac{3}{32}''$ to $1\frac{3}{8}''$ inside square, similarly shaped expander sleeves $1\frac{1}{4}''$ long, $1\frac{1}{32}''$ O. D. with $\frac{1}{8}''$ wall thickness serve satisfactorily. For about $1\frac{1}{2}''$ to $1\frac{13}{16}''$ O. D. round tubing, $1\frac{5}{16}''$ to $1^{21}/_{32}''$ I. D., or $1\frac{1}{2}''$ outside square tubing, $1^{11}/_{32}''$ to $1\frac{7}{16}''$ inside square, similarly shaped expander sleeves $1\frac{1}{4}''$ long, $1\frac{9}{32}''$ O. D., with $\frac{7}{32}''$ wall thickness serve satisfactorily. For round tubing from about $1\frac{3}{4}''$ to 2" O. D., $1\frac{5}{8}''$ to $1\frac{7}{8}''$ I. D., or 2" outside square tubing, $1^{29}/_{32}''$ inside square, similarly shaped expander sleeves $1\frac{1}{4}''$ long, $1\frac{9}{16}''$ O. D. with $\frac{7}{32}''$ wall thickness serve satisfactorily.

While I have herein illustrated and described preferred forms and embodiments of my invention, changes, modifications and improvements therein will occur to those skilled in the art who come to understand the practices and precepts hereof, and I do not care to be limited to any

I claim:

1. In combination a socket, a stud and means for detachably securing said stud in said socket in cushioned relation thereto, said means comprising when said socket and stud are secured together, at least one hollow stressed rubber-like part of uniform composition and uniform wall thickness and having an exaggerated barrel shape and having its mid-portion in external frictional engagement with the socket and its mid-portion radially spaced from the stud, having its ends spaced from the socket and connected with the stud and having its portions between the ends and the middle stressed and bent in cushioned load bearing relation between said socket and said stud.

2. The combination of claim 1 and means associated with said stud for exerting longitudinal compressive forces on said part including members adapted to bear on the ends of said part said members having annular seats and central portions adapted to extend slightly within the ends of said part.

3. The combination of claim 1 in which a plurality of said rubber-like parts are axially aligned with their adjacent ends closely disposed.

4. In an adapter for securing a caster stud or the like within a hollow socket in which compressive forces are applied to a tubular expander by means associated with said stud, the improvement which consists that the expander comprise a hollow tubular sleeve of uniform composition, which in its idle state comprises a right cylindrical sleeve of uniform wall thickness coaxial with said stud, whose outside surface is spaced from the wall of said socket, the thickness of the wall of the sleeve being small in relation to the length and diameter thereof whereby to induce outward bulging of the wall symmetrically about the axis of the stud under longitudinal compression, and which tubular sleeve in its working state takes symmetrical form of substantially uniform wall thickness whose central wall portion is curved radially outwardly into contact with the wall of said socket and whose inside diameters at every point along the length of the sleeve are not decreased relative to corresponding diameters in the idle state, said tubular sleeve being made of rubber-like material having from about 50 to 70 durometer hardness.

WILLIAM C. ROE.

REFERENCES CITED

The following references are of record in the file of this patent:

UNITED STATES PATENTS

| Number | Name | Date |
| --- | --- | --- |
| 1,879,429 | Noelting et al. | Sept. 27, 1932 |
| 1,929,743 | Jarvis et al. | Oct. 10, 1933 |
| 2,155,826 | Herold | Apr. 25, 1939 |
| 2,155,827 | Herold | Apr. 25, 1939 |
| 2,155,828 | Herold | Apr. 25, 1939 |